US011082367B2

(12) United States Patent
Gareau et al.

(10) Patent No.: US 11,082,367 B2
(45) Date of Patent: Aug. 3, 2021

(54) FLEXE FRAME FORMAT USING 256B/257B BLOCK ENCODING

(71) Applicant: Ciena Corporation, Hanover, MD (US)

(72) Inventors: Sebastien Gareau, Ottawa (CA); Eric S. Maniloff, Stittsville (CA)

(73) Assignee: Ciena Corporation, Hanover, MD (US)

( * ) Notice: Subject to any disclaimer, the term of this patent is extended or adjusted under 35 U.S.C. 154(b) by 111 days.

(21) Appl. No.: 16/408,576

(22) Filed: May 10, 2019

(65) Prior Publication Data

US 2020/0358722 A1    Nov. 12, 2020

(51) Int. Cl.
| | | |
|---|---|---|
| *H04L 12/931* | (2013.01) | |
| *H04L 12/26* | (2006.01) | |
| *H04L 12/861* | (2013.01) | |
| *H04L 12/879* | (2013.01) | |

(52) U.S. Cl.
CPC ........ *H04L 49/9057* (2013.01); *H04L 49/901* (2013.01)

(58) Field of Classification Search
CPC ........ G06F 13/28; G06F 13/22; G06F 13/385; G06F 1/32; G06F 2213/3808; G06F 3/0625; H04J 3/1658; H04J 14/0227; H04J 2203/0003; H04J 2203/0085; H04J 2203/0089; H04J 3/1611; H04L 12/66; H04L 47/10; H04L 49/20; H04L 49/351; H04L 49/602
See application file for complete search history.

(56) References Cited

U.S. PATENT DOCUMENTS

| | | |
|---|---|---|
| 9,800,361 B2 | 10/2017 | Gareau et al. |
| 9,838,290 B2 | 12/2017 | Gareau |
| 10,097,480 B2 | 10/2018 | Gareau et al. |
| 10,193,688 B2 | 1/2019 | Gareau et al. |
| 10,218,823 B2 | 2/2019 | Gareau |
| 10,256,909 B2 | 4/2019 | Gareau et al. |
| 2013/0111077 A1* | 5/2013 | Gowravaram .......... G06F 13/28 710/22 |
| 2013/0138875 A1* | 5/2013 | Kamphenkel ....... G06F 12/0246 711/103 |

(Continued)

OTHER PUBLICATIONS

Roy Cideciyan, 256b/257b Transcoding for 100 Gb/s Backplane and Copper Cable, IEEE 802.3bj, Mar. 12-16, 2012, Hawaii, pp. 1-21.

(Continued)

*Primary Examiner* — Sai Aung
(74) *Attorney, Agent, or Firm* — Clements Bernard Walker; Lawrence A. Baratta, Jr.; Christopher L. Bernard

(57) ABSTRACT

A circuit includes a buffer configured to receive a first Flexible Ethernet (FlexE) frame having 66b blocks including 66b overhead blocks and 66b data blocks, wherein the buffer is configured to accumulate the 66b overhead blocks and the 66b data blocks; a mapping circuit configured to map four x 66b overhead blocks from the buffer into a 257b overhead block and to map a sequence of four x 66b data blocks from the buffer into a 257b data block; and a transmit circuit configured to transmit a second FlexE frame having 257b blocks from the mapping circuit. The mapping circuit can be configured to accumulate four 66b blocks of a same kind from the buffer for mapping into a 257b block, where the same kind is one of overhead and a particular calendar slot n where n=0-19.

17 Claims, 11 Drawing Sheets

(56) References Cited

U.S. PATENT DOCUMENTS

| | | | |
|---|---|---|---|
| 2015/0055664 A1* | 2/2015 | Kanonakis | H04Q 11/00 |
| | | | 370/535 |
| 2016/0119075 A1 | 4/2016 | Gareau et al. | |
| 2016/0182084 A1 | 6/2016 | Yang et al. | |
| 2017/0005742 A1* | 1/2017 | Gareau | H04J 3/1658 |
| 2017/0005901 A1* | 1/2017 | Gareau | H04L 43/0811 |
| 2017/0005949 A1* | 1/2017 | Gareau | H04L 12/413 |
| 2017/0006360 A1* | 1/2017 | Gareau | G06F 13/40 |
| 2017/0093757 A1* | 3/2017 | Gareau | H04L 43/0864 |
| 2017/0171163 A1* | 6/2017 | Gareau | H04L 63/08 |
| 2018/0167160 A1 | 6/2018 | Gareau et al. | |

OTHER PUBLICATIONS

OIF Optical Internetworking Forum, Flex Ethernet Implementation Agreement, IA # OIF-FLEXE-01.1, Jun. 21, 2017, pp. 1-35.
OIF Optical Internetworking Forum, Flex Ethernet Implementation Agreement, IA # OIF-FLEXE-01.0, Mar. 2016, pp. 1-31.
OIF Optical Internetworking Forum, Flex Ethernet 2.0 Implementation Agreement, IA # OIF-FLEXE-02.0, Jun. 22, 2018, pp. 1-51.
Jul. 31, 2020, International Search Report and Written Opinion for International Application No. PCT/US2020/032263.
Caia et al., "Flex025n Multiplexing and Overhead structures for 25G/52G M-OTN interfaces", WD11-24, FiberHome Telecommunication Technologies, China Telecom, vol. 11/15, 12/15, May 28, 2018, pp. 1-16.

\* cited by examiner

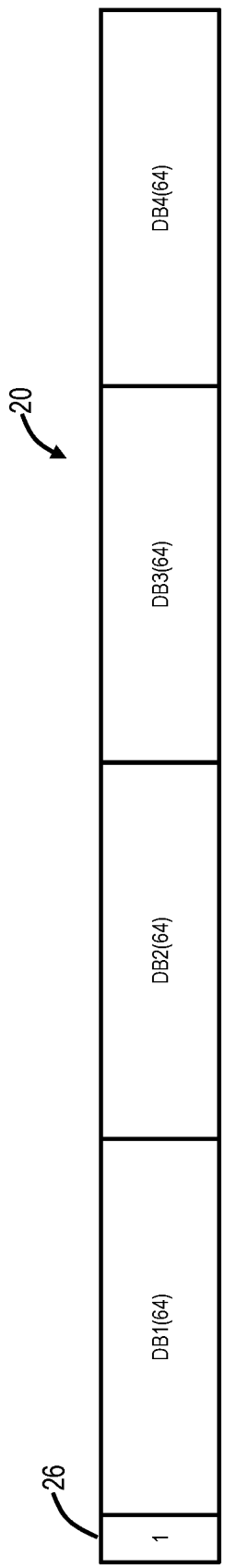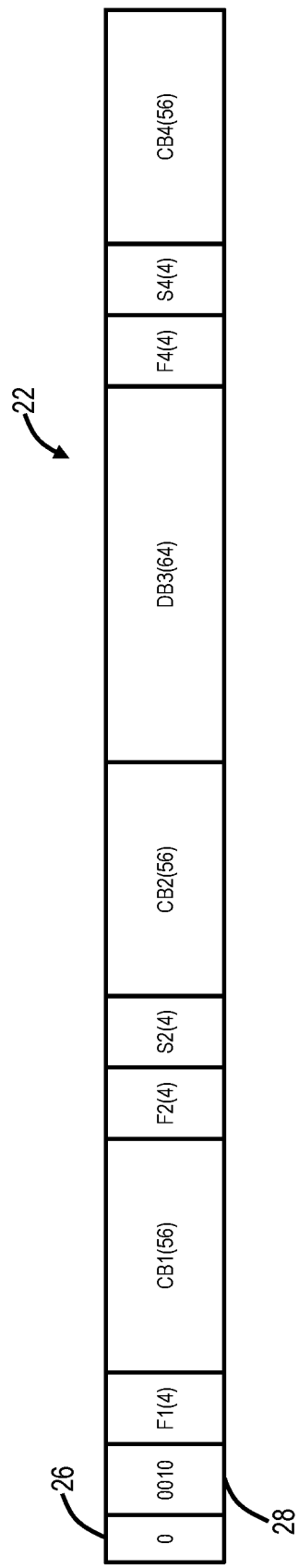

FLEXE FRAME FORMAT USING 256B/257B BLOCK ENCODING

FIELD OF THE DISCLOSURE

The present disclosure generally relates to Ethernet networking. More particularly, the present disclosure relates to systems and methods for a Flexible Ethernet (also referred to as FlexE or Flex Ethernet) frame format using 256b/257b block encoding.

BACKGROUND OF THE DISCLOSURE

FlexE (Flex Ethernet) is currently defined in the Optical Internetworking Forum (OIF) such as via the Flex Ethernet 2.0 Implementation Agreement, IA #OIF-FLEXE-02.0, Jun. 22, 2018, the Flex Ethernet 1.1 Implementation Agreement, IA #OIF-FLEXE-01.1, Jun. 21, 2017, and the Flex Ethernet 1.0 Implementation Agreement, IA #OIF-FLEXE-01.0, March 2016, the contents of each are incorporated by reference herein. FlexE allows for flexible Ethernet connectivity between routers and optical transport equipment that is independent of the physical interfaces between the two devices. The net benefit is the ability to remotely adjust service bandwidth as needed, more efficiently utilize each networking layer, and improve end-to-end manageability of the network. FlexE dissociates the Ethernet rate on the client side from the actual physical interface (also called server) by introducing a new shim through the IEEE defined Media Access Control (MAC) and Physical Coding Sublayer (PCS) layers. The current FlexE standard is defined for 100G PHYs, with 200G/400G PHYs being defined in subsequent Implementation Agreements.

64b/66b is a line code that transforms 64-bit data to 66-bit line code to provide enough state changes to allow reasonable clock recovery and alignment of the data stream at the receiver. It was defined by the IEEE 802.3 working group as part of the IEEE 802.3ae-2002 amendment which introduced 10 Gbit/s Ethernet. The overhead of 64b/66b encoding is 2 coding bits for every 64 payload bits or 3.125%. FlexE has a frame structure (Time Division Multiplexing (TDM) structure) based on 66b block boundaries in 64b/66b encoding. FlexE is designed to work with legacy (no Forward Error Correction (FEC)) 100G PCS/PHY that are based on 64b/66b encoding.

FlexE encoded with 64b/66b encoding is wasteful in bandwidth compared to 256b/257b encoding which is being used in newer standards such as for 400 GbE (Gigabit Ethernet) including OIF 400ZR. A 256b/257b encoding provides a ~3% improvement in bandwidth relative to 64b/66b encoding. Current FlexE with Optical Transport Network (OTN) mapping procedures are all based on 66b since they need access to the individual FlexE overhead blocks and calendar slots. Standard transcoding FlexE 66b blocks into a 257b PCS results in a non-optimal structure. The FlexE overhead will float inside a 257b block and will change position (1 out of 4). It is not obvious to locate the FlexE OH and frame boundaries without having to trans-decode back to 66b. The FlexE clients or calendar slots are distributed on 66b boundaries and mixed within 257b blocks.

For designs that require mapping Ethernet signals to OTN (or OIF 400ZR) and want to keep data signals in the 257b transcoded format to save on bandwidth, the complexities mentioned above will lead to latency, extra complexity, logic, and power. OIF 400ZR has been defined to transport transcoded Ethernet data directly to save on bandwidth, and will likely result in a class of ZR type of solutions that optimize power and spectral utilization by directly transporting transcoded Ethernet. While these solutions can be used to transport FlexE, they do not provide a means of rate-reduction by dropping the unused timeslots.

BRIEF SUMMARY OF THE DISCLOSURE

In an embodiment, a circuit includes a buffer configured to receive a first Flexible Ethernet (FlexE) frame having 66b blocks including 66b overhead blocks and 66b data blocks, wherein the buffer is configured to accumulate the 66b overhead blocks and the 66b data blocks; a mapping circuit configured to map four x 66b overhead blocks from the buffer into a 257b overhead block and to map a sequence of four x 66b data blocks from the buffer into a 257b data block; and a transmit circuit configured to transmit a second FlexE frame having 257b blocks from the mapping circuit. The circuit can further include a demapping circuit configured to receive a third Flexible Ethernet (FlexE) frame having 257b blocks including 257b overhead blocks and 257b data blocks; a second buffer connected to the demapping circuit, wherein the demapping circuit is configured to demap the 257b overhead blocks into four x 66b overhead blocks that are stored in the buffer and to demap the 257b data blocks into four x 66b data blocks that are stored in the buffer; and a second transmit circuit configured to transmit a fourth FlexE frame having 66b blocks from the buffer.

The mapping circuit can be configured to accumulate four 66b blocks of a same kind from the buffer for mapping into a 257b block, where the same kind is one of overhead and a particular calendar slot n where n=0-19. Both the first FlexE frame and the second FlexE frame can have 20 calendar slots for FlexE client data, wherein each calendar slot in the first FlexE frame is a 66b block, and wherein the second FlexE frame can have four accumulated calendar slots of a same kind in a 257b block. The sequence can include 1023 repetitions of the 20 four accumulated calendar slots between overhead blocks. Both the first FlexE frame and the second FlexE frame can utilize a same calendar slot distribution scheme. The first FlexE frame can utilize a multiframe approach where each 66b overhead block is one of eight blocks, and wherein the second FlexE frame can maintain the multiframe approach where two 257b overhead blocks support the eight blocks. The buffer can separately buffer the 66b overhead blocks and the 66b data blocks. A pointer in the 66b overhead blocks can be utilized to coordinate additional or removal of FlexE clients in the 66b data blocks.

In another embodiment, a method includes, in electrical circuitry, receiving a Flexible Ethernet (FlexE) frame having 66b blocks including 66b overhead blocks and 66b data blocks; buffering received 66b overhead blocks and 66b data blocks; mapping four x 66b overhead blocks from the buffering into a 257b overhead block and a sequence of four x 66b data blocks from the buffering into a 257b data block; and transmitting a FlexE frame having 257b blocks based on the mapping steps. The method can further include receiving a third Flexible Ethernet (FlexE) frame having 257b blocks including 257b overhead blocks and 257b data blocks in a buffer; demapping the 257b overhead blocks into four x 66b overhead blocks that are stored in the buffer and demapping the 257b data blocks into four x 66b data blocks that are stored in the buffer; and transmitting a fourth FlexE frame having 66b blocks from the buffer.

The mapping can include accumulating four 66b blocks of a same kind from a buffer for mapping into a 257b block, where the same kind is one of overhead and a particular calendar slot n where n=0-19. Both the first FlexE frame and the second FlexE frame can have 20 calendar slots for FlexE client data, wherein each calendar slot in the first FlexE frame can be a 66b block, and wherein the second FlexE frame can have four accumulated calendar slots of a same kind in a 257b block. The sequence can include 1023 repetitions of the 20 four accumulated calendar slots between overhead blocks. Both the first FlexE frame and the second FlexE frame can utilize a same calendar slot distribution scheme. The first FlexE frame can utilize a multi-frame approach where each 66b overhead block is one of eight blocks, and wherein the second FlexE frame can maintain the multiframe approach where two 257b overhead blocks support the eight blocks. A buffer can separately buffer the 66b overhead blocks and the 66b data blocks. A pointer in the 66b overhead blocks can be utilized to coordinate additional or removal of FlexE clients in the 66b data blocks.

In a further embodiment, an apparatus includes circuitry configured to assemble overhead into a first 257b block of a Flexible Ethernet (FlexE) frame, wherein the overhead includes alignment data, calendar information, and a management channel; circuitry configured to provide a plurality of 257b data blocks according to a calendar and subsequent to the first 257b block with the overhead; and circuitry configured to transmit the FlexE frame have the first 257b block and the plurality of 257b data blocks, wherein the first 257b block and the plurality of 257b data blocks utilize 256b/257b block encoding. Unused 257b data blocks from the plurality of 257b data blocks can be discarded prior to transmission by the circuitry configured to transmit.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a 257b block that is a Data Block (DB);

FIG. 4 is a block diagram of a 257b block that is a Control Block (CB);

DETAILED DESCRIPTION OF THE DISCLOSURE

Figure 1:
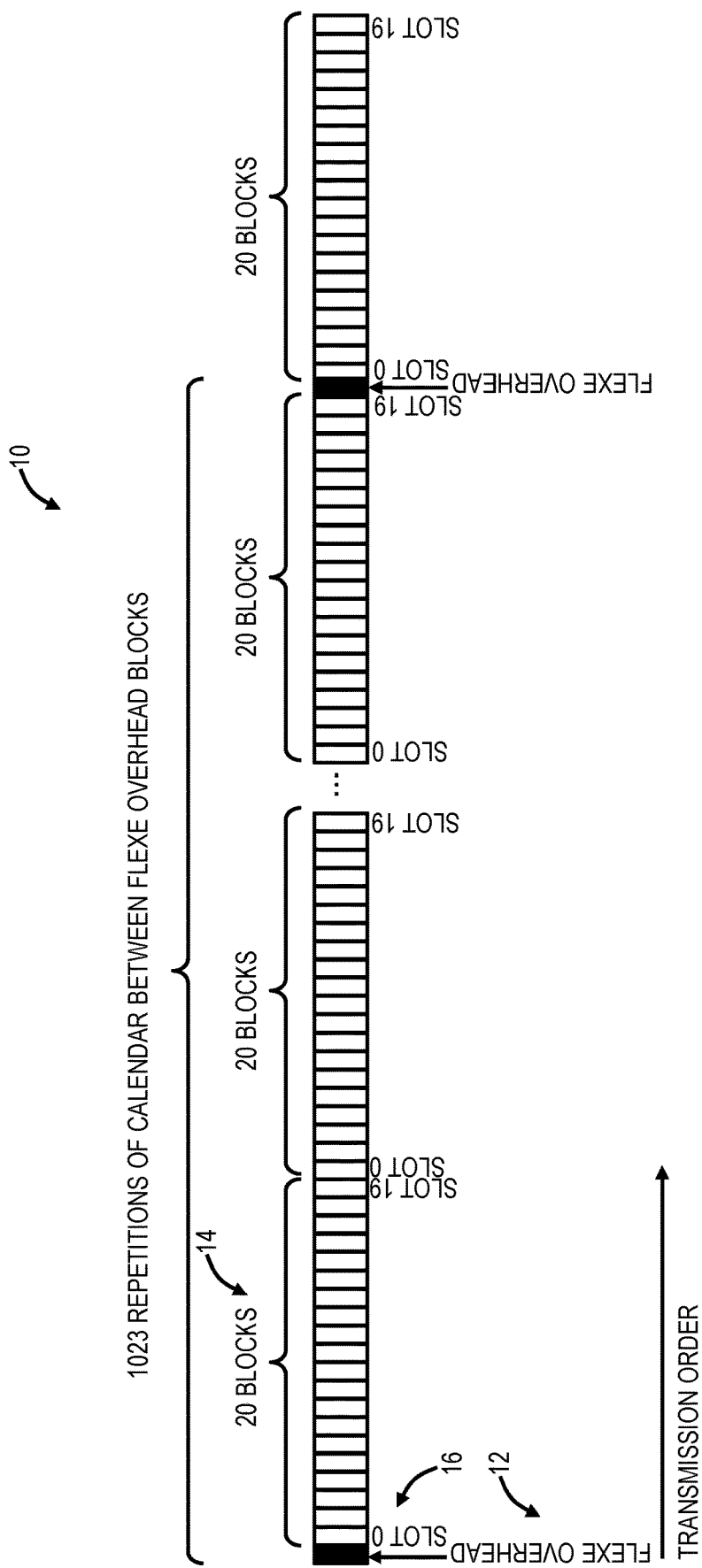
FIG. 1 is a block diagram of a FlexE frame currently defined in the Optical Internetworking Forum (OIF) illustrating insertion of FlexE overhead on each 100G FlexE Instance of a FlexE Group.

In various embodiments, the present disclosure relates to systems and methods for a FlexE frame format using 256b/257b block encoding. Specifically, the systems and methods reorder the existing FlexE frame structure based on 64b/66b encoding into something that is convenient for 257b PHYs and mappers. Advantageously, the systems and methods described herein provide efficient bandwidth mapping, sub-rating, overhead access and FlexE awareness in the 256b/257b block encoding, support for 4×100 GbE in a 400ZR, and legacy 64b/66b interoperability. For the efficient bandwidth mapping, there is momentum in the industry to keep Ethernet signals in their transcoded format to save on bandwidth. For example, OIF 400ZR keeps 400GbE in its 257b format when mapping to the ZR frame. A new design interfacing directly to a gray 400GE PHY or a 400ZR optical module could skip the 64b/66b encoding step altogether and create a FlexE signal in the 257b native form altogether, saving power, latency, and circuitry.

For sub-rating, there is a movement to add Ethernet mappings in the 257b format instead of always reverting to 66b as is the current standard. The "crunching" or sub-rating would be greatly simplified since all the unequipped calendar slots are now grouped into common 257b blocks. The circuitry can simply drop 257b blocks that are not mapped into an Optical Data Unit flex (ODUflex). Again, it removes the need for trans-decoding back to 66b, saves on power, latency, and circuitry. In applications that need access to FlexE overhead, for example, neighbor discovery or Precision Time Protocol (PTP), the FlexE overhead 257b block can easily be located. For 400ZR modules, adding FlexE awareness can be greatly simplified, and would not require trans-decoding back to 66b. Again, savings include power, latency, and circuitry.

There is a push to support 4×100GbE clients in 400ZR applications. The FlexE frame format could be used as a multiplexing service layer where four clients are mapped directly into grouped 5×257b calendar slows, and this structure is then be adapted to the 400ZR frame format, saving power, latency, and circuitry. Finally, for legacy 66b interoperability, new designs can optimize and implement the 257b FlexE systems and methods described herein, and the burden of the legacy 66b support falls to interworking scenarios with 100GbE (no FEC) interfaces. 257b is aligned to common bus width found in the latest 16/7 nm devices.

All new (beyond 100G) Ethernet PHYs require FEC and are based on 256b/257b encoding. Additionally, 100GbE Ethernet has been extended with 257b for newer standards. Many new designs do not actually implement 64b/66b encoding anymore and directly adapt a packet stream (via Medium Independent Interface (MII)) into 257b PCS encoding. As mentioned above, the 66b FlexE frame 10 can be transcoded easily into 257b. However, there are drawbacks as described herein, namely latency, extra complexity, circuitry, and power.

FlexE Frame Based on 66b

FIG. 1 is a block diagram of a FlexE frame 10 currently defined in the OIF illustrating insertion of FlexE overhead 12 on each 100G FlexE Instance of a FlexE Group. In the FlexE frame 10, a frame/overhead block 12 (which is a 66b block) is located every 20*1023 blocks 14 (which are also 66b blocks). After the frame/overhead block 12, the frame payload is also then divided into 20 66b calendar slots 16. Note, the blocks 14 are the data in the calendar slots 16.

The FlexE mechanism operates using a calendar which assigns 66B block 14 positions on sub-calendars on each 100G FlexE Instance of the FlexE Group to each of the FlexE Clients. The calendar is described with a granularity of 5G (although implementations may have a different granularity, e.g., 25G), and has a length of twenty 5G slots 16 per 100G of FlexE Group capacity. Two calendar configurations are supported: an "A" and a "B" calendar configuration. At any given time, one of the calendar configurations is used for mapping the FlexE Clients into the FlexE Group and demapping the FlexE Clients from the FlexE Group. The two calendar configurations are provided to facilitate reconfiguration. When a switch of calendar configurations adds or removes FlexE Clients from the FlexE Group, existing clients whose size and calendar slot 16 assignments are not changed by changing the calendar configuration are not affected.

For a FlexE Group composed of n 100G FlexE Instances, the logical length of the calendar is 20n. The blocks 14 as allocated per the calendar are distributed to n sub-calendars of length 20 on each of the 100G FlexE Instances of the FlexE Group. The order of distribution of twenty blocks 14 at a time is selected over simple "round robin" distribution of 66B blocks 14. Calendar slots 16 are identified by their 100G FlexE Instance number and the slot [0-19] (within that 100G FlexE Instance). The "logical" sequence number of a calendar slot 16 is 20× the instance number plus the calendar slot number within the 100G FlexE Instance. The sequence is in ascending order. Note that the sequence numbering is not necessarily consecutive when the assigned PHY numbers are not contiguous. This logical order only matters when calendar slots on different 100G FlexE Instances are assigned to the same FlexE Client.

The alignment of the data from the 100G FlexE Instances of the FlexE Group is accomplished by the insertion of FlexE overhead 12 into the stream of 66B blocks 14 carried over the group. The FlexE overhead 12 is delineated by a 66B block which can be recognized independently of the FlexE Client data. An illustration of the FlexE overhead on each 100G FlexE Instance of the FlexE Group is given in FIG. 1.

On a 100G FlexE Instance, the FlexE overhead 12 block will occur approximately once per 13.1 μs. The actual format of the FlexE overhead 12 blocks is such that they occur in a repeating sequence of eight blocks, so the sequence has a period of approximately 104.77 μs. This sequence of overhead blocks is inserted in the same positions in the sub-calendar sequence on each 100G FlexE Instance and is used to align all of the 100G FlexE Instances of the FlexE Group at the FlexE demux to reconstruct the sequence in the order of the calendar so that the FlexE Clients can be recovered.

The anchor position of the FlexE overhead 12 on each 100G FlexE Instance is encoded as an ordered set (control block type 0×4B). A distinct "O" (operational) code is used (0×5) which is different from that for the sequence ordered set used by Ethernet or the signal ordered set used by Fibre channel. The information to be transmitted in the FlexE overhead is encoded into the bytes D1, D2, and D3 of the ordered set block.

Figure 2:
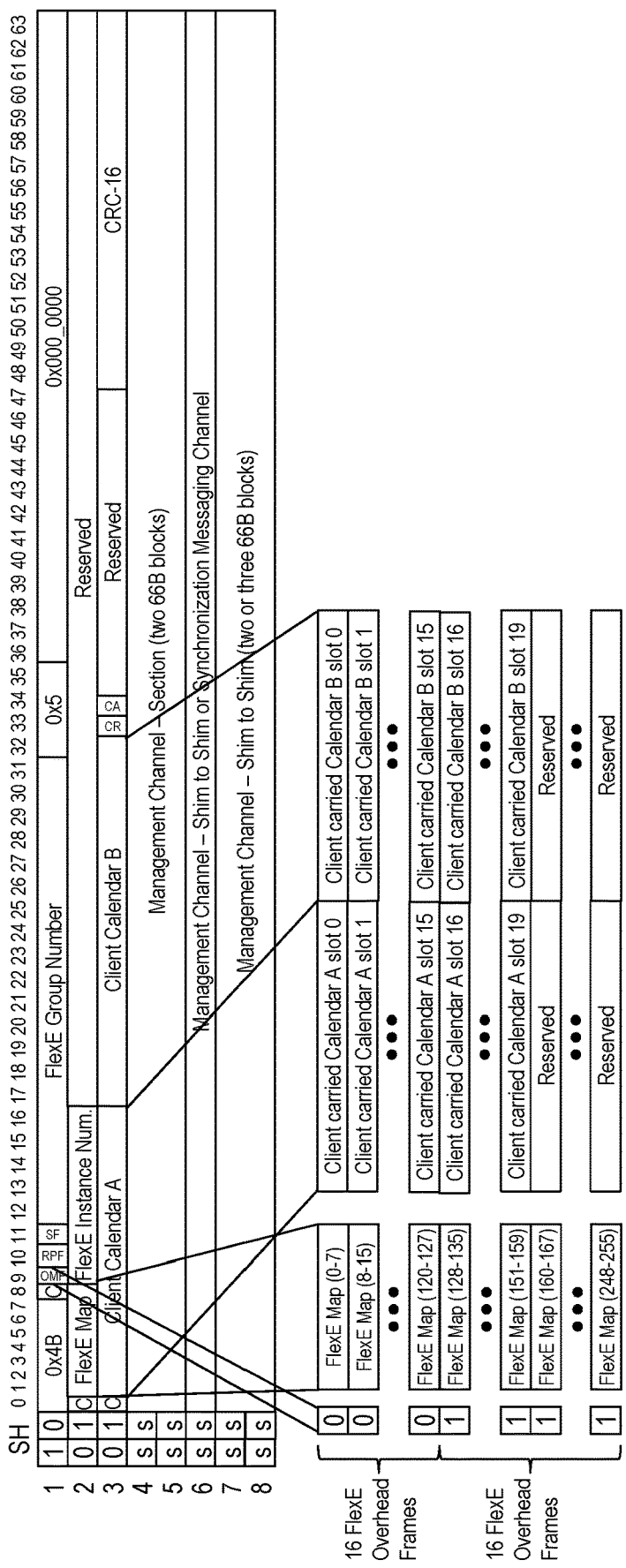
FIG. 2 is a block diagram of a FlexE overhead frame and multiframe.

The information which needs to be included in the overhead 12 includes:

Which 100G FlexE Instances are part of this FlexE Group;

The number identifying this 100G FlexE Instance within the FlexE Group. Note that multiple 100G FlexE Instances carried on a 200GBASE-R or 400GBASE-R each have a different 100G FlexE Instance number constructed using the PHY number, while for 100GBASE-R PHYs, the 100G FlexE Instance number and the PHY number are the same. (100G FlexE Instance numbers are unique within a FlexE Group. They are independent between FlexE Groups. Two 100G FlexE instances in different FlexE Groups may have the same 100G FlexE Instance number.);

A way to transmit the programming of the sub-calendar configurations for each 100G FlexE Instance from the FlexE mux to the FlexE demux;

A way to indicate which calendar configurations ("A" or "B") is in use at this time;

The FlexE Group number that this 100G FlexE instance is a member of (if necessary, for the case where the same 100G FlexE Instance number may be configured to be part of different FlexE Groups);

Fields to support protocols necessary for changing the configuration of FlexE Clients into calendar slots 16;

Two optional management channels. These may not be necessary in all applications (for example, if a network management system has direct access to the FlexE Shim at both ends of the connection), but may be useful for applications such as using FlexE for an n×100G umbilicus to a remote shelf of lower-rate ports. One management channel (the 4th and 5th blocks of the FlexE overhead 12 frame of the first 100G FlexE Instance on a given PHY) is available for communication across a section (for example, from a router with a FlexE Shim to FlexE aware transport equipment which does not terminate the FlexE Shim), and the other management channel (the 6th-8th or 7th-8th blocks of the FlexE overhead frame of the first 100G FlexE Instance on a given PHY) is used for communication between the FlexE Shims; and An optional synchronization messaging channel. If configured, this is carried in the 6th block of the FlexE overhead frame of the first 100G FlexE Instance on a given PHY. The amount of information to be conveyed from the FlexE mux to the FlexE demux exceeds the 24 bits available in a single ordered set block per 100G FlexE Instance. This is addressed by spreading the relevant overhead across a sequence of eight FlexE overhead blocks on each 100G FlexE Instance, each separated by 20×1023 FlexE data blocks. This group of eight overhead blocks is referred to as the FlexE overhead 12 frame. The FlexE overhead frame and multiframe is illustrated in FIG. 2. The first block 14 of the FlexE overhead 12 frame is encoded as an ordered set. The next two FlexE overhead 12 blocks 14 are encoded as data 66B data blocks. The final five FlexE overhead blocks 14 are reserved for the two optional management channels, and may carry any legal 66B block per [802.3] FIG. 82-5 (excluding Ordered Sets with O code=0×5, as this is reserved for 100G FlexE Instance overhead).

The first block in the FlexE overhead 12 frame serves as a marker to be used for alignment and re-interleaving of the sub-calendars from each of the 100G FlexE Instances of the FlexE Group at the FlexE demux. One FlexE overhead frame consisting of eight 66B overhead blocks is transmitted in approximately 104.77 μs. Subject to the amount of buffer provided in a given implementation, skew detection and compensation across the 100G FlexE Instances of the FlexE Group can be compensated up to nearly half of this amount.

In the FlexE frame 10, the FlexE overhead 12 is encoded as 66B blocks and are inserted on each 100G FlexE Instance of the FlexE Group. One overhead 12 block is inserted after every 1023 iterations of the length 20 sub-calendar of 66B FlexE data blocks 14, so the sequence is one block of overhead 12 followed by 1023×20 blocks of data followed by one block of overhead 12.

FlexE overhead frame lock is achieved at the receiver (FlexE demux) on each PHY by recognizing the FlexE block 1 of the FlexE overhead frame, encoded as a special ordered set (the sync header is 10, the control block type is 0x4B (ordered set), and the "O" code is 0x5), and then finding the FlexE ordered set block again (1023×20+1)×8 block positions later. Once FlexE overhead frame lock is achieved, the next expected FlexE overhead block will be 1023×20+1 block positions later. While in FlexE overhead frame lock, bytes D1-D3 of the ordered set block, plus the 66B blocks occurring at 20461, 40922, 61383, 81844, 102305, 122766, and 143227 blocks beyond the ordered set block will be interpreted as FlexE overhead frame. FlexE overhead is not interpreted if not in FlexE overhead lock. FlexE overhead lock will be lost if the sync header, control block type, or O code do not match at the expected position for 5 occurrences.

Certain information is transmitted in every FlexE overhead frame. Other information is distributed across a sequence of 32 FlexE overhead frames, referred to as the FlexE overhead multiframe. The OMF (overhead multiframe) bit has a value of "0" for the first sixteen overhead frames of the overhead multiframe, and a value of "1" for the last sixteen overhead frames of the overhead multiframe. The FlexE demux achieves overhead multiframe lock on each 100G FlexE Instance when the OMF bit transitions from a "0" to a "1" or a "1" to a "0" in consecutive overhead frames with good CRC. There are two opportunities in the overhead multiframe for the FlexE demux to achieve overhead multiframe lock.

New FlexE Frame Format Based on 257b

The present disclosure proposes a new FlexE frame format with 257b block sizes and optimized for this new encoding, but compatible with the 66b encoding of the FlexE frame 10. This new FlexE frame format skips the intermediate step of 66b encoding and can be adapted directly on new Ethernet PCS/PHYs. The legacy FlexE frame 10 can be directly adapted to the new 257b FlexE frame format, and this shuffling is explained later.

FIG. 3 is a block diagram of a 257b block 20 that is a Data Block (DB). FIG. 4 is a block diagram of a 257b block 22 that is a Control Block (CB). The 257b block as defined in IEEE 802.3 is as follows: a header bit 26 indicates if the block 20, 22 contains control blocks (CB) or only data blocks (DB). If the header bit 26 is 1, then the remaining 256 bits are data, e.g., four DB1-DB4 as illustrated in FIG. 3. If the header bit 26 is 0, then the next 4-bit field 28 provides a mask for which of the four 64-bit words are CB versus DB. For example, FIG. 4 has a mask of 0010 meaning the first two blocks are CB, the third block (DB3) is a DB, and the fourth block is CB.

Figure 5:
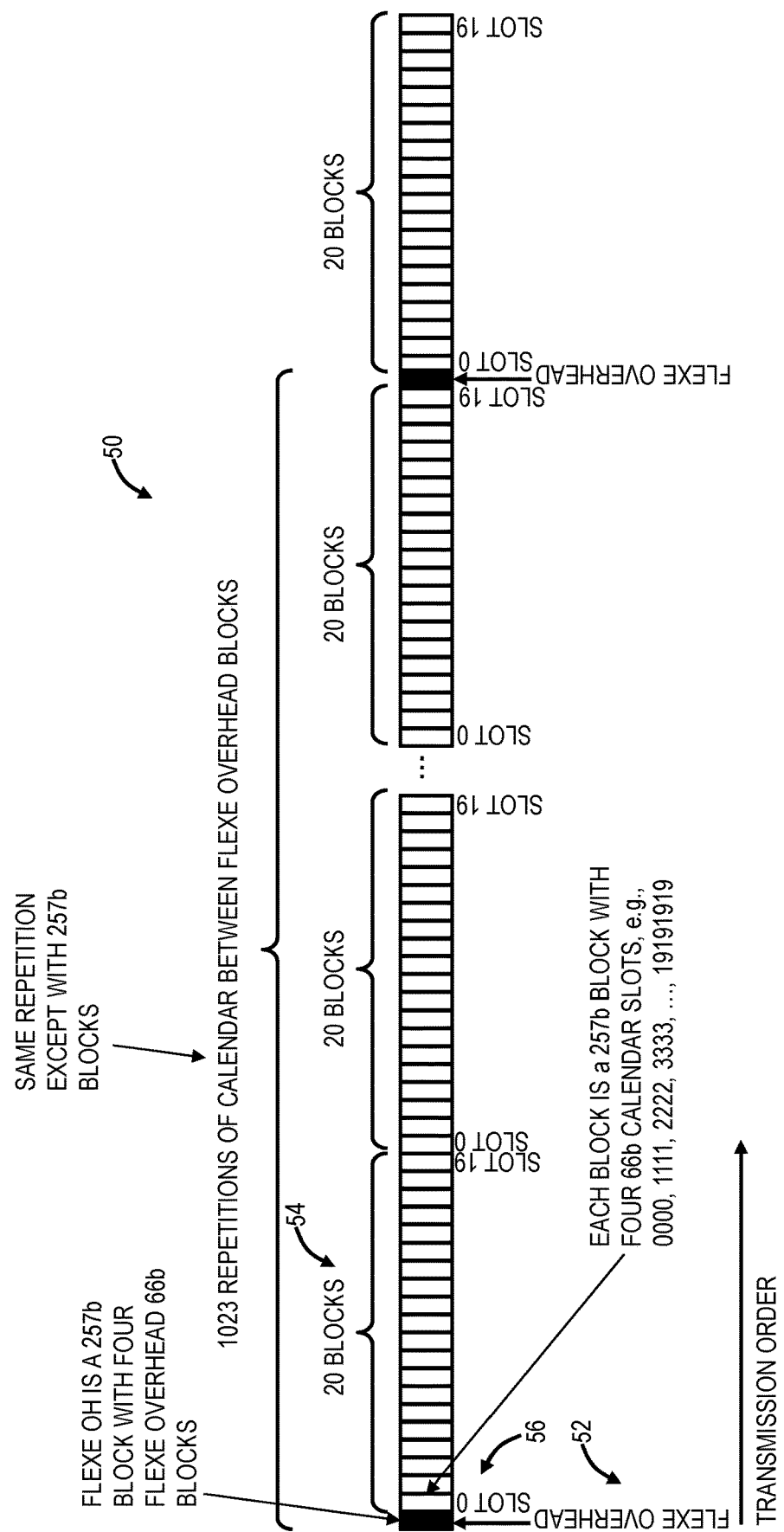
FIG. 5 is a block diagram of a new FlexE frame based on 257b blocks.

FIG. 5 is a block diagram of a new FlexE frame 50 based on 257b blocks 54. In an embodiment, the new FlexE frame 50 natively supports 256b/257b encoding and uses a similar structure as the existing FlexE frame 10 with 66b blocks. Specifically, the FlexE frame 50 includes overhead 52 blocks that are 257b followed by 20*1023 data blocks 54 that are also 257b and include slots 56 0 to 19. This is possible as the 257b blocks have 256b of data or control and the 66b blocks have 64b of data or control, i.e., the 256b of data and control is a multiple of 64b.

Figure 6:
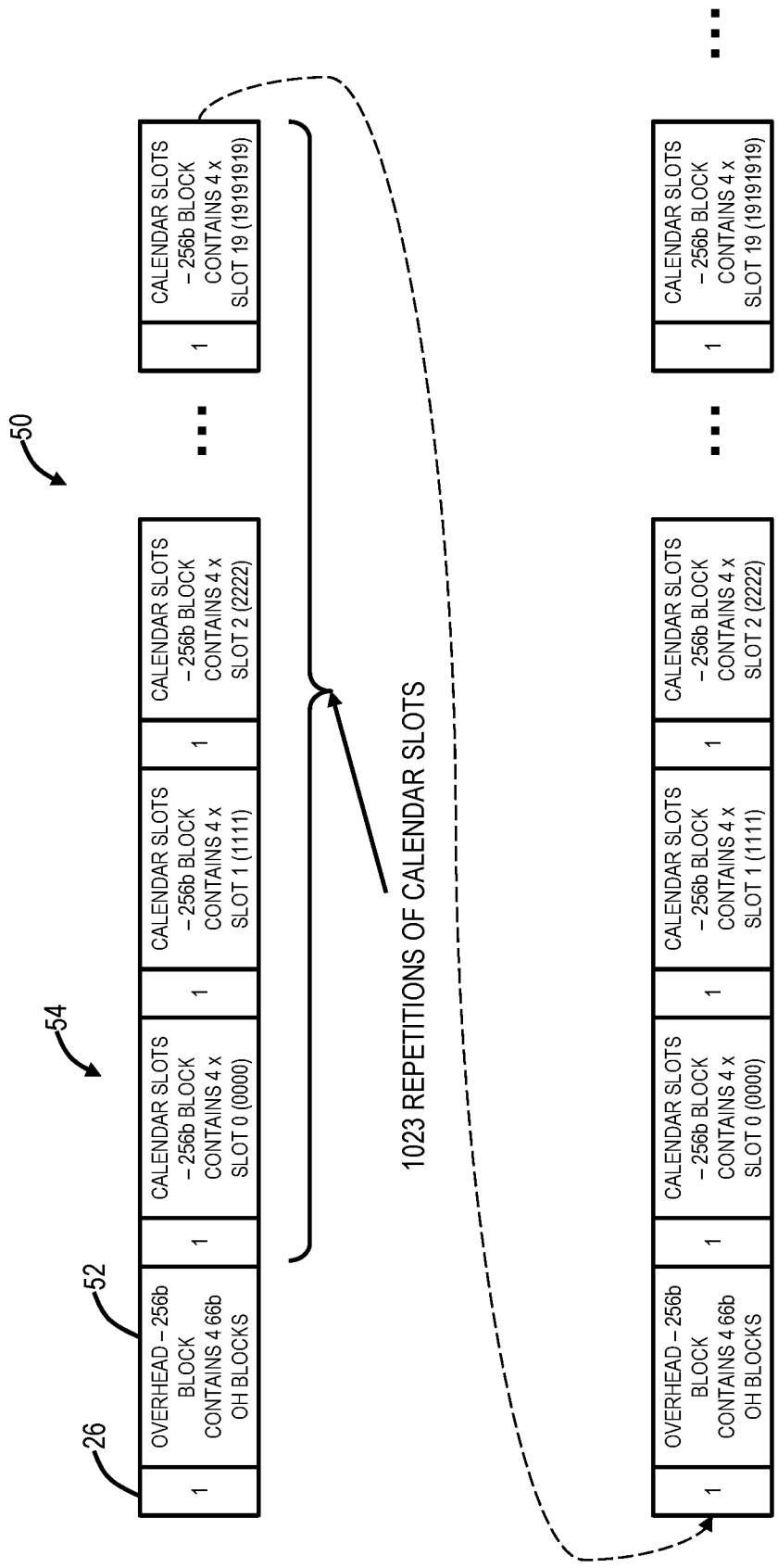
FIG. 6 is a block diagram of FlexE frames with the 257b overhead block and the 257b data blocks carrying the same data as the FlexE frame that uses 66b blocks.

In another embodiment, the new FlexE frame 50 includes a shuffling or reordering of the FlexE frame 10 into something that is efficient for 257b PHYs and mappers. FIG. 6 is a block diagram of FlexE frames 50 with the 257b overhead block 52, and the 257b data blocks 54 carrying the same data as the FlexE frame 10 that uses 66b blocks. The new FlexE frame 50 would use an entire 257b block 52, 54 and essentially defines 4×CBs (or DBs), each of these resembling the format already defined in the FlexE frame 10.

Figure 7:
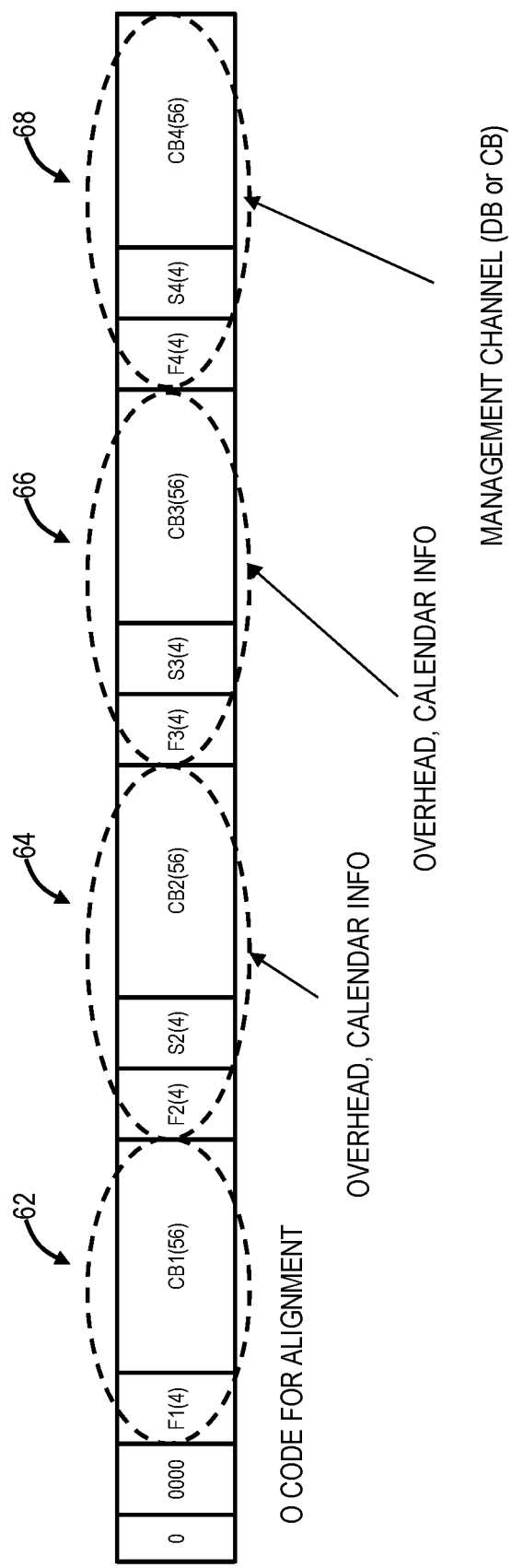
FIG. 7 is a block diagram of four 257b blocks for the FlexE 50 representing eight x 66b blocks for a multiframe from the FlexE frame.

For the FlexE overhead 52, this can include four of the FlexE overhead 12 66b blocks concatenated into a single 257b block for the FlexE frame 50. Also, since the current FlexE standard based on 66b blocks define eight×66b blocks for a multiframe, the new FlexE frame 50 can utilize two x 257b blocks for the multiframe (see FIG. 2). FIG. 7 is a block diagram of four 257b blocks 62, 64, 66, 68 for the FlexE frame 50 representing eight×66b blocks for a multiframe from the FlexE frame 10. Here, the new FlexE frame 50 concatenates eight×66b blocks from the multiframe from the FlexE frame 10 into two×257b blocks.

Again, the multiframe from the FlexE frame 10 includes eight 66b blocks (see FIG. 2). The first block 14 of the FlexE overhead 12 frame is encoded as an ordered set. The next two FlexE overhead 12 blocks 14 are encoded as data 66B data blocks. The final five FlexE overhead blocks 14 are reserved for the two optional management channels, and may carry any legal 66B block per [802.3] FIG. 82-5 (excluding Ordered Sets with O code=0x5, as this is reserved for 100G FlexE Instance overhead).

FIG. 7 illustrates the first four 257b blocks in the multiframe from the FlexE frame 10. The 257b block 62 includes four of the first block from FIG. 2 which is an O-code for alignment. The 257b blocks 64, 66 include four of the second and third bocks from FIG. 2, respectively, which include overhead and calendar information. The 257b block 68 includes four of the fourth block from FIG. 2 which is a management channel. The 257b block 68 can be a DB or CB. Not shown is the second of the two x 257b blocks, and this includes four of the fifth through eight blocks from FIG. 2 which are management channels.

In FIG. 6, the occurrence between the frame/OH blocks 52, 54 is still 20*1023 blocks, although, in this case, 257b blocks are used since each OH block carries 4 of the previous OH blocks. The framing algorithm should provide similar behavior since the occurrence of the O-code (within the 257b block) does not change. The payload 257b blocks can be composed with a mix of CB and DB depending on the FlexE client data. The calendar can be grouped and be the same #within the 257b blocks. In this new scheme for the FlexE frame 50, there is still a round-robin distribution of the 257b blocks to service up to 20 clients (calendar slots), i.e., 0, 1, 2, 3, 4, . . . 19, 0, 1, 2, 3, 4, . . . , 19, . . . .

Back in FIG. 5, the diagram for the client distribution is quite similar to that of existing FlexE frame 10, but with 257b block sizes. The 20 clients work out to an even multiple in the existing frame structure. The sequence of 1 . . . 20 will be locked with respect to the frame boundaries.

Again, to support the existing FlexE frame 10 in the FlexE frame 50, there is an accumulation of four x 66b blocks and then mapping into a 257b block. This includes accumulation of four x 66b FlexE overhead 12 blocks and insertion into a 257b block for the FlexE overhead 52 with the same occurrence of frame boundaries. This also includes buffering and accumulation of four x 66b calendar slots 16 and insertion into a single 257b block 54. This means each of the data blocks 54 includes four slots 16. This can include a new order for the calendar slots, namely 0000 in a first block, 1111 in a second block, 2222, in a third block, etc. where each block includes four 66b blocks (instances) of the same calendar slot.

Figure 8:
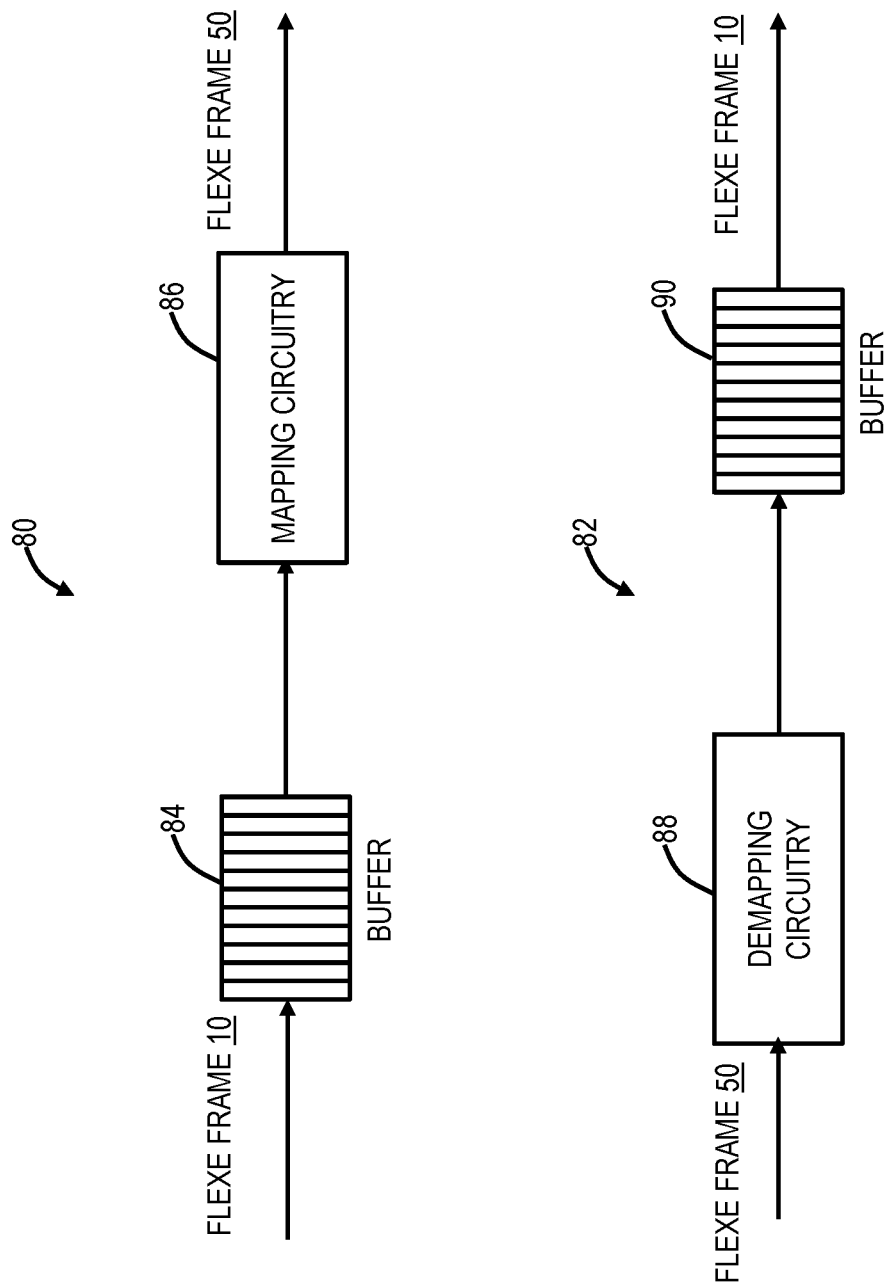
FIG. 8 is a block diagram of a mapping circuit and a demapping circuit for interfacing the FlexE frame at 66b blocks with the FlexE frame at 257b blocks.

FIG. 8 is a block diagram of a mapping circuit 80 and a demapping circuit 82 for interfacing the FlexE frame 10 at 66b blocks with the FlexE frame 50 at 257b blocks. The mapping circuit 80 receives a FlexE frame 10 and utilizes a buffer 84 to accumulate 66b blocks which are mapped out by mapping circuitry 86 to provide the FlexE frame 50. The mapping circuitry 86 can accumulate four 66b blocks of the same kind, i.e., overhead, a particular calendar slot n where n=0-19.

Figure 9:
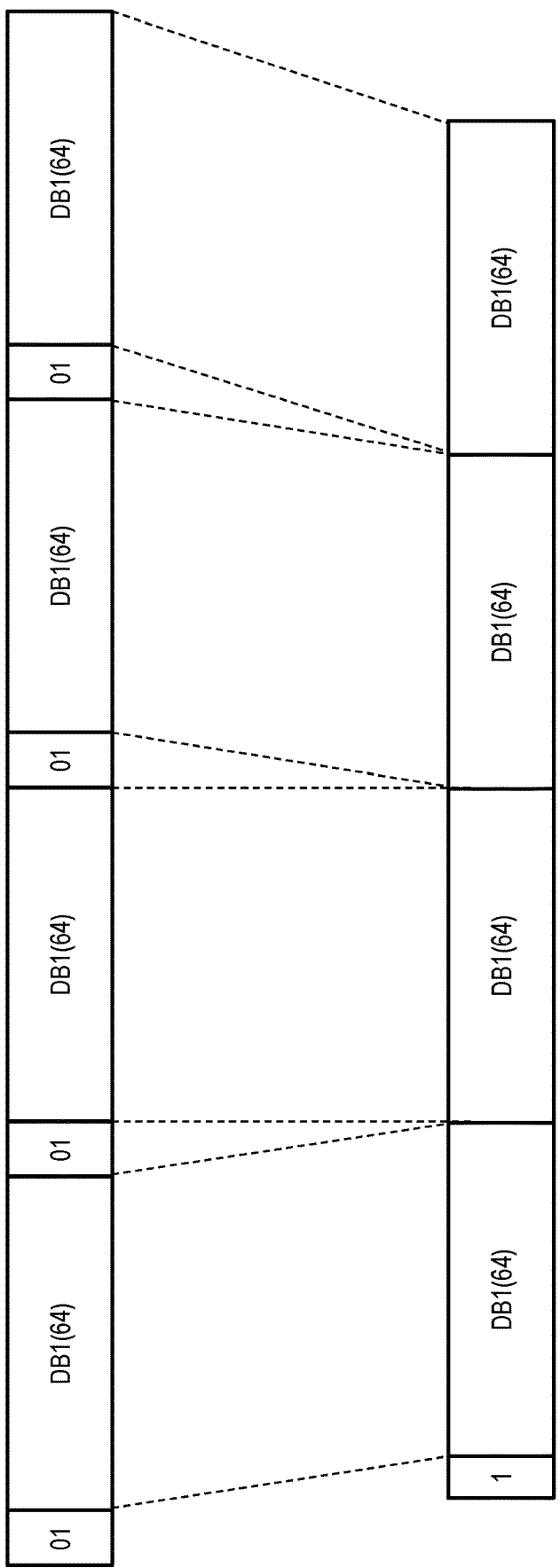
FIG. 9 is a block diagram of mapping four Data Blocks (DB) at 66b into one 257b block.
Figure 10:
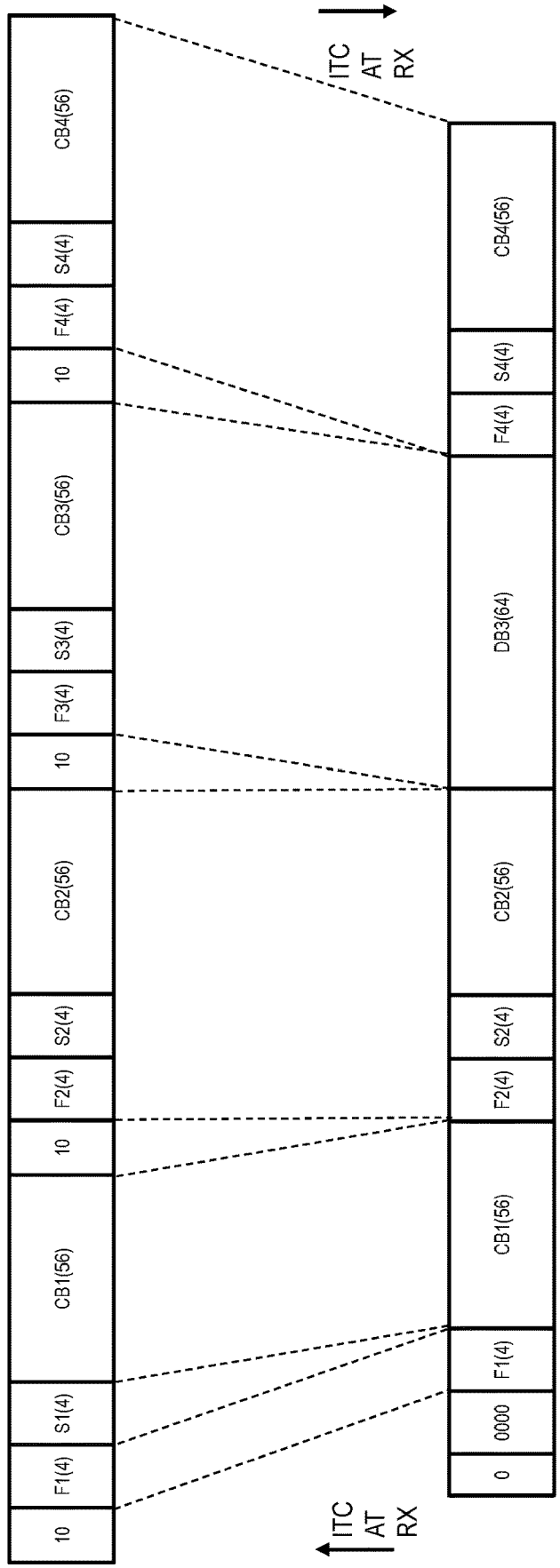
FIG. 10 is a block diagram of mapping four Control Blocks (CB) at 66b into one 257b block.

FIG. 9 is a block diagram of mapping four Data Blocks (DB) at 66b into one 257b block. FIG. 10 is a block diagram of mapping four Control Blocks (CB) at 66b into one 257b block. The mapping circuitry 86 can utilize the mappings from FIGS. 9 and 10. A special ordering technique can be defined as follows to convert existing 66b based FlexE frame 10 into this new 257b format. The technique mostly involves reordering the 66b blocks, then reuses standard transcoding method of 4×66b to 257b.

Back in FIG. 8, the demapping circuit 82 receives the FlexE frame 50, and demapping circuit 88 performs an inverse mapping from the mapping circuit 80 and stores the 66b blocks in a buffer 90 where they are read out in a sequence to provide the FlexE frame 10.

From a circuit implementation, this buffering and accumulation will add less than 100 ns of latency between the FlexE frame 10 and the FlexE frame 50, while there is an efficient mapping. The FlexE overhead 12 can be reinserted by the demapping circuit 82 or terminated.

Most overhead fields do not have any phase relationship with the data. However, the C (calendar in use) field indicates a swap and this swap is coordinated on both TX and RX so that the add/removal of FlexE clients is hitless. The reordering technique above can buffer data and overhead separately (in the buffers 84, 90) and changes the relationship of the data to the overhead. A pointer (e.g., using reserved FlexE fields in the FlexE overhead 12) can be used to coordinate the event (in relation to the data blocks) when the swap occurs.

In an embodiment, the FlexE frame 50 can originate solely in the 257b domain. An apparatus can include circuitry configured to assemble overhead into a first 257b block of a Flexible Ethernet (FlexE) frame, wherein the overhead includes alignment data, calendar information, and a management channel; circuitry configured to provide a plurality of 257b data blocks according to a calendar and subsequent to the first 257b block with the overhead; and circuitry configured to transmit the FlexE frame have the first 257b block and the plurality of 257b data blocks, wherein the first 257b block and the plurality of 257b data blocks utilize 256b/257b block encoding. Unused 257b data blocks from the plurality of 257b data blocks can be discarded prior to transmission by the circuitry configured to transmit. For example, the 257b FlexE apparatus can be directly connected to a transport system that discards unused 257b blocks to perform a crunch function prior to transport.

FlexE Frame in 66b to 257b Process

Figure 11:
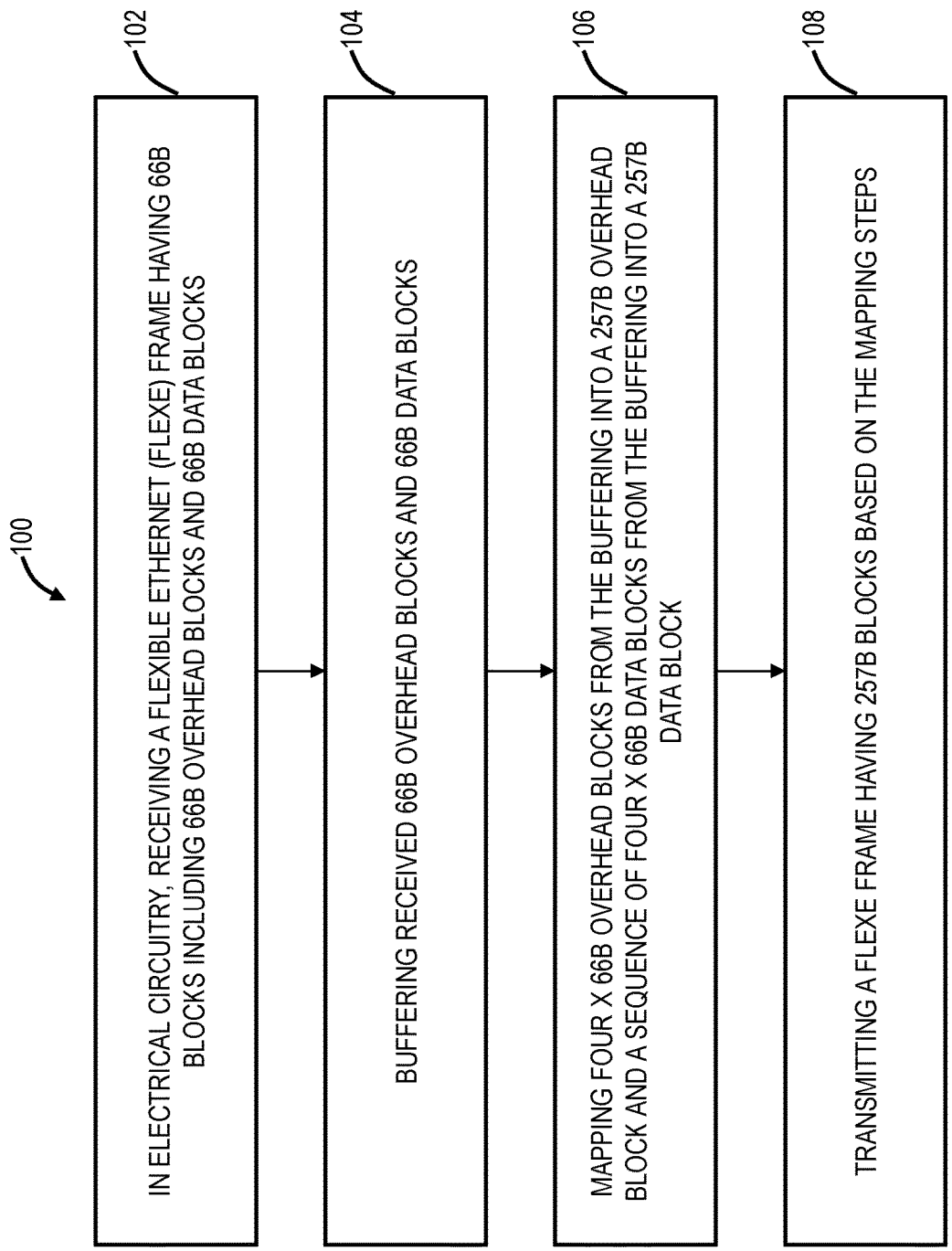
FIG. 11 is a flowchart of a process for mapping the FlexE frame with 66b blocks into the FlexE frame with 257b blocks.

FIG. 11 is a flowchart of a process 100 for mapping the FlexE frame 10 with 66b blocks into the FlexE frame 50 with 257b blocks. The process 100 is implemented in electrical circuitry and includes receiving a Flexible Ethernet (FlexE) frame having 66b blocks including 66b overhead blocks and 66b data blocks (step 102); buffering received 66b overhead blocks and 66b data blocks (step 104); mapping four x 66b overhead blocks from the buffering into a 257b overhead block and a sequence of four x 66b data blocks from the buffering into a 257b data block (step 106); and transmitting a FlexE frame having 257b blocks based on the mapping steps (step 108).

The process 100 can further include receiving a third Flexible Ethernet (FlexE) frame having 257b blocks including 257b overhead blocks and 257b data blocks in a buffer; and demapping the 257b overhead blocks into four x 66b overhead blocks that are stored in the buffer and demapping the 257b data blocks into four x 66b data blocks that are stored in the buffer; and transmitting a fourth FlexE frame having 66b blocks from the buffer.

The mapping can include accumulating four 66b blocks of the same kind from a buffer for mapping into a 257b block, where the same kind is one of overhead and a particular calendar slot n where n=0-19. Both the first FlexE frame and the second FlexE frame cab have 20 calendar slots for FlexE client data, wherein each calendar slot in the first FlexE frame can be a 66b block, and wherein the second FlexE frame can have four accumulated calendar slots of the same kind in a 257b block. The sequence can include 1023 repetitions of the 20 four accumulated calendar slots between overhead blocks. Both the first FlexE frame and the second FlexE frame can utilize the same calendar slot distribution scheme. The first FlexE frame can utilize a multiframe approach where each 66b overhead block is one of eight blocks, and wherein the second FlexE frame maintains the multiframe approach where two 257b overhead blocks support the eight blocks. A buffer can separately buffer the 66b overhead blocks and the 66b data blocks. A pointer in the 66b overhead blocks can be utilized to coordinate additional or removal of FlexE clients in the 66b data blocks.

FlexE Frame in 257b

Figure 12:
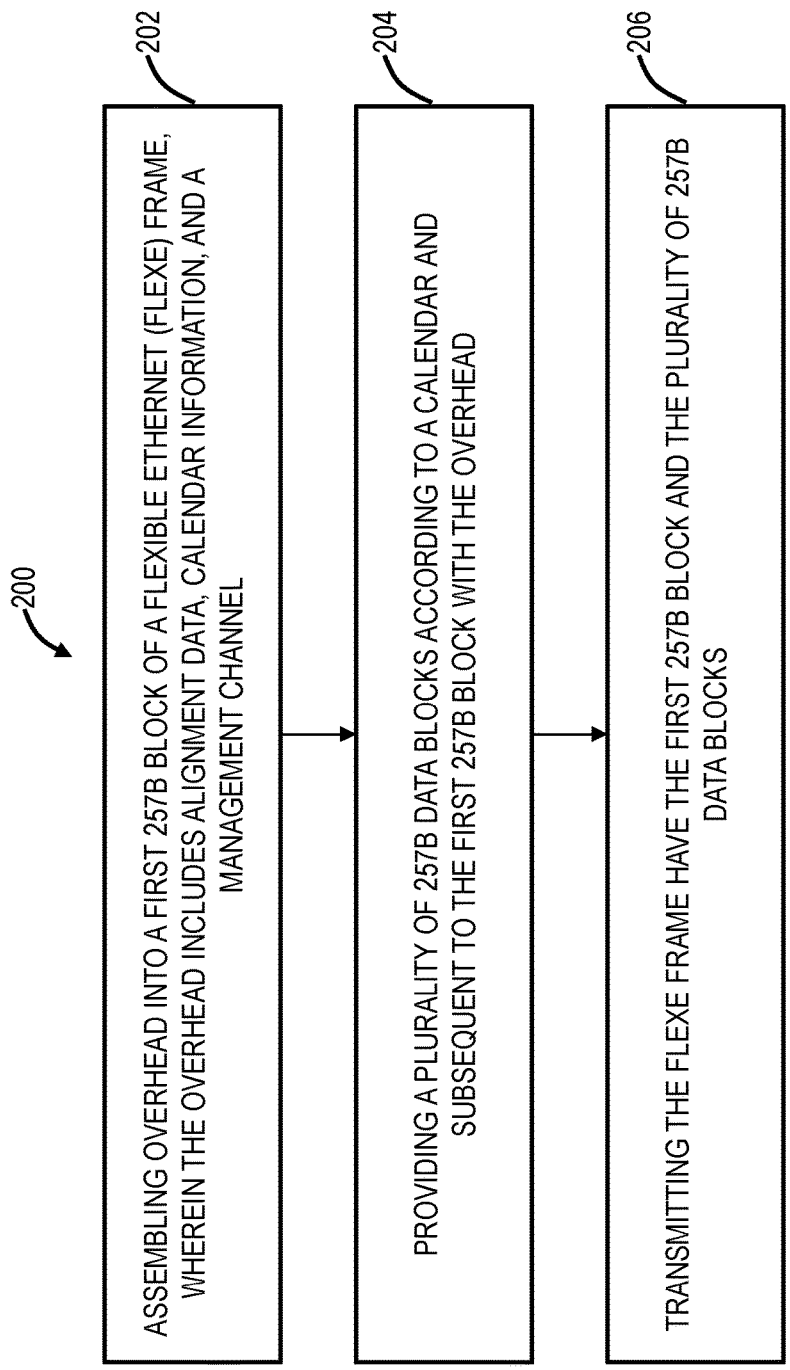
FIG. 12 is a flowchart of a process for mapping the FlexE frame with 257b blocks.

FIG. 12 is a flowchart of a process 200 for mapping the FlexE frame 50 with 257b blocks. The process 200 is implemented in electrical circuitry and includes assembling overhead into a first 257b block of a Flexible Ethernet (FlexE) frame, wherein the overhead includes alignment data, calendar information, and a management channel (step 202); providing a plurality of 257b data blocks according to a calendar and subsequent to the first 257b block with the overhead (step 204); and transmitting the FlexE frame have the first 257b block and the plurality of 257b data blocks (step 206), wherein the first 257b block and the plurality of 257b data blocks utilize 256b/257b block encoding. Unused 257b data blocks from the plurality of 257b data blocks can be discarded prior to transmission.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A circuit comprising:
a buffer configured to receive a first Flexible Ethernet (FlexE) frame having 66-bit (66b) blocks including 66b overhead blocks and 66b data blocks, wherein the buffer is configured to accumulate the 66b overhead blocks and the 66b data blocks;
a mapping circuit configured to map four 66b overhead blocks from the buffer into a 257-bit (257b) overhead block and to map a sequence of four 66b data blocks from the buffer into a 257b data block, wherein the mapping circuit is configured to accumulate four 66b blocks of a same kind from the buffer for mapping into a 257b block; and
a transmit circuit configured to transmit a second FlexE frame having 257b blocks from the mapping circuit, wherein both the first FlexE frame and the second FlexE frame have 20 calendar slots for FlexE client data, wherein each calendar slot in the first FlexE frame is a 66b block, and wherein the second FlexE frame has four accumulated 66b blocks in each 257b block.

2. The circuit of claim 1, further comprising:
a demapping circuit configured to receive a third Flexible Ethernet (FlexE) frame having 257b blocks including 257b overhead blocks and 257b data blocks;
a second buffer connected to the demapping circuit, wherein the demapping circuit is configured to demap the 257b overhead blocks into four 66b overhead blocks that are stored in the second buffer and to demap the 257b data blocks into four 66b data blocks that are stored in the second buffer; and a second transmit circuit configured to transmit a fourth FlexE frame having 66b blocks from the second buffer.

3. The circuit of claim 1, wherein the same kind is one of overhead and a particular calendar slot n where n=0–19.

4. The circuit of claim 1, wherein the sequence includes 1023 repetitions of the 20 four accumulated calendar slots between overhead blocks.

5. The circuit of claim 1, wherein both the first FlexE frame and the second FlexE frame utilize a same calendar slot distribution scheme.

6. The circuit of claim 1, wherein the first FlexE frame utilizes a multiframe approach where each 66b overhead block is one of eight blocks, and wherein the second FlexE frame maintains the multiframe approach where two 257b overhead blocks support the eight blocks.

7. The circuit of claim 1, wherein the buffer separately buffers the 66b overhead blocks and the 66b data blocks.

8. The circuit of claim 7, wherein a pointer in the 66b overhead blocks is utilized to coordinate addition or removal of FlexE clients in the 66b data blocks.

9. An apparatus comprising:
circuitry configured to assemble overhead into a first 257-bit (257b) block of a Flexible Ethernet (FlexE) frame, wherein the overhead includes alignment data, calendar information, and a management channel;
circuitry configured to provide a plurality of 257b data blocks according to a calendar and subsequent to the first 257b block with the overhead; and
circuitry configured to transmit the FlexE frame with the first 257b block and the plurality of 257b data blocks that are used,
wherein the first 257b block and the plurality of 257b data blocks utilize 256b/257b block encoding,
wherein unequipped 257b data blocks from the plurality of 257b data blocks are discarded prior to transmission by the circuitry configured to transmit.

10. A circuit comprising:
a buffer configured to receive a first Flexible Ethernet (FlexE) frame having 66-bit (66b) blocks including 66b overhead blocks and 66b data blocks, wherein the buffer is configured to accumulate the 66b overhead blocks and the 66b data blocks;
a mapping circuit configured to map four 66b overhead blocks from the buffer into a 257-bit (257b) overhead block and to map a sequence of four 66b data blocks from the buffer into a 257b data block, wherein the mapping circuit is configured to accumulate four 66b blocks of a same kind from the buffer for mapping into a 257b block; and
a transmit circuit configured to transmit a second FlexE frame having 257b blocks from the mapping circuit, wherein the buffer separately buffers the 66b overhead blocks and the 66b data blocks.

11. The circuit of claim 10, further comprising:
a demapping circuit configured to receive a third Flexible Ethernet (FlexE) frame having 257b blocks including 257b overhead blocks and 257b data blocks;
a second buffer connected to the demapping circuit, wherein the demapping circuit is configured to demap the 257b overhead blocks into four 66b overhead blocks that are stored in the second buffer and to demap the 257b data blocks into four 66b data blocks that are stored in the second buffer; and
a second transmit circuit configured to transmit a fourth FlexE frame having 66b blocks from the second buffer.

12. The circuit of claim 10, wherein the same kind is one of overhead and a particular calendar slot n where n=0–19.

13. The circuit of claim 10, wherein both the first FlexE frame and the second FlexE frame have calendar slots for FlexE client data, wherein each calendar slot in the first FlexE frame is a 66b block, and wherein the second FlexE frame has four accumulated calendar slots of a same kind in a 257b block.

14. The circuit of claim 13, wherein the sequence includes 1023 repetitions of the 20 four accumulated calendar slots between overhead blocks.

15. The circuit of claim 13, wherein both the first FlexE frame and the second FlexE frame utilize a same calendar slot distribution scheme.

16. The circuit of claim 10, wherein the first FlexE frame utilizes a multiframe approach where each 66b overhead block is one of eight blocks, and wherein the second FlexE frame maintains the multiframe approach where two 257b overhead blocks support the eight blocks.

17. The circuit of claim 10, wherein a pointer in the 66b overhead blocks is utilized to coordinate addition or removal of FlexE clients in the 66b data blocks.

* * * * *